United States Patent
Toosky et al.

(10) Patent No.: US 9,404,521 B2
(45) Date of Patent: Aug. 2, 2016

(54) SELF INTEGRATING STRUCTURAL INSERT SLEEVE

(71) Applicants: Rahmatollah F. Toosky, San Clemente, CA (US); Nicholas A. Elliott, Mission Viejo, CA (US)

(72) Inventors: Rahmatollah F. Toosky, San Clemente, CA (US); Nicholas A. Elliott, Mission Viejo, CA (US)

(73) Assignee: Polaris Fastening Consulting, LLC, San Clemente, CA (US)

( * ) Notice: Subject to any disclaimer, the term of this patent is extended or adjusted under 35 U.S.C. 154(b) by 46 days.

(21) Appl. No.: 14/100,017

(22) Filed: Dec. 9, 2013

(65) Prior Publication Data

US 2014/0161556 A1    Jun. 12, 2014

Related U.S. Application Data

(60) Provisional application No. 61/736,010, filed on Dec. 12, 2012.

(51) Int. Cl.
*F16B 19/10* (2006.01)
*B25B 27/00* (2006.01)
*F16B 19/02* (2006.01)

(52) U.S. Cl.
CPC .......... *F16B 19/1081* (2013.01); *B25B 27/0007* (2013.01); *F16B 19/1045* (2013.01); *F16B 19/02* (2013.01)

(58) Field of Classification Search
CPC .................................................... F16B 19/1081
USPC ...................................................... 411/44, 69
See application file for complete search history.

(56) References Cited

U.S. PATENT DOCUMENTS

| | | |
|---|---|---|
| 1,116,710 A | 11/1914 | Keller |
| 1,365,719 A | 1/1921 | Ogden |
| 2,343,143 A | 2/1944 | Gill |
| 2,531,048 A | 11/1950 | Huck |
| 2,670,021 A | 2/1954 | Torresen et al. |
| 3,180,203 A | 4/1965 | Vaughn |
| 3,345,900 A | 10/1967 | Villo |
| 3,463,046 A | 8/1969 | Welch et al. |
| 3,505,921 A | 4/1970 | Wigam |
| 3,698,278 A | 10/1972 | Trembley |
| 3,750,525 A | 8/1973 | Waters et al. |
| 3,785,241 A | 1/1974 | Fischer |
| 3,789,728 A | 2/1974 | Shackelford |

(Continued)

FOREIGN PATENT DOCUMENTS

| | | |
|---|---|---|
| JP | 8-61348 | 3/1996 |
| JP | 2006-38201 | 2/2006 |

*Primary Examiner* — Flemming Saether
(74) *Attorney, Agent, or Firm* — Loza & Loza LLP; Heidi L. Eisenhut

(57) ABSTRACT

A self-integrating insert sleeve assembly, comprising an insert sleeve and an expander pin, for insertion into an aperture of a work piece is provided. Upon installation, the insert sleeve component is incrementally expanded by interaction with the pin, and secured to the aperture of the work piece, such that the resulting aperture of the installed insert sleeve has a predetermined diameter, and the resulting structure now contains compressive residual stresses. Thus, the installed insert sleeve may be employed as a hole repair solution, allowing for the installation of an original size fastener per structural design within a damaged and reconditioned aperture, or simply for enhanced structural fatigue life. The installation of this insert sleeve may be done through various manners, including pull type, push type, and blind type installation processes.

6 Claims, 14 Drawing Sheets

(56) References Cited

U.S. PATENT DOCUMENTS

| | | |
|---|---|---|
| 3,792,933 A | 2/1974 | Stencel |
| 3,835,615 A | 9/1974 | King, Jr. |
| 3,916,970 A | 11/1975 | Owens |
| 3,965,792 A | 6/1976 | King, Jr. |
| 4,048,898 A | 9/1977 | Salter |
| 4,102,036 A | 7/1978 | Salter |
| 4,244,661 A | 1/1981 | Dervy |
| 4,355,934 A | 10/1982 | Denham et al. |
| 4,405,256 A | 9/1983 | King, Jr. |
| 4,408,937 A | 10/1983 | Hainke et al. |
| 4,732,518 A | 3/1988 | Toosky |
| 4,850,771 A | 7/1989 | Hurd |
| 5,051,048 A | 9/1991 | Maddox |
| 5,259,714 A | 11/1993 | Campbell |
| 5,312,215 A | 5/1994 | Anquetin |
| 6,042,315 A | 3/2000 | Miller et al. |
| 6,176,662 B1 * | 1/2001 | Champney et al. .......... 411/171 |
| 6,773,215 B2 | 8/2004 | Cuva et al. |
| 7,038,842 B2 | 5/2006 | Griseri et al. |
| 7,059,815 B2 | 6/2006 | Ando et al. |
| 7,059,816 B2 | 6/2006 | Toosky |
| 7,114,900 B2 | 10/2006 | Toosky |
| 7,237,314 B2 | 7/2007 | Toosky |
| 7,566,195 B2 | 7/2009 | Hull |
| 7,575,404 B2 | 8/2009 | Toosky et al. |
| 7,695,226 B2 | 4/2010 | March et al. |
| 7,698,798 B2 | 4/2010 | Toosky |
| 7,802,952 B2 | 9/2010 | Toosky et al. |
| 7,823,262 B2 | 11/2010 | Toosky et al. |
| 2004/0231467 A1 | 11/2004 | Hufnagl et al. |
| 2005/0002760 A1 | 1/2005 | Hayashi et al. |
| 2005/0201844 A1 | 9/2005 | Davies et al. |
| 2006/0193711 A1 | 8/2006 | Di-Mola |
| 2007/0009338 A1 | 1/2007 | Hull |
| 2008/0075555 A1 | 3/2008 | March et al. |
| 2010/0278608 A1 * | 11/2010 | Toosky .......... 411/45 |

* cited by examiner

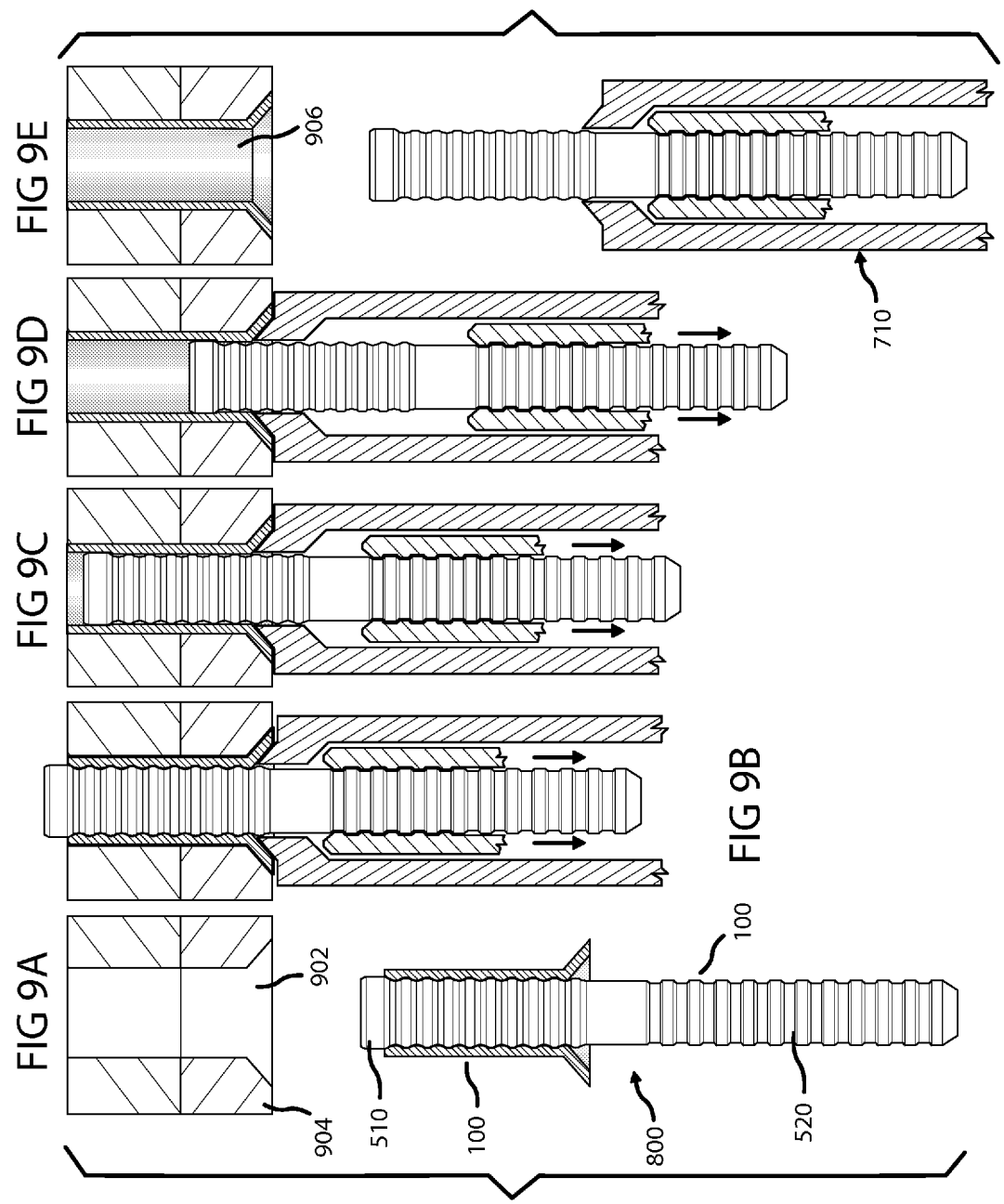

SELF INTEGRATING STRUCTURAL INSERT SLEEVE

CLAIM OF PRIORITY UNDER 35 U.S.C. §119

The present Application for Patent claims priority to U.S. Provisional Application No. 61/736,010 entitled "INCREMENTALLY EXPANDING STRUCTURAL INSERT", filed Dec. 12, 2013 and is hereby expressly incorporated by reference herein.

FIELD

Various embodiments pertain to inserts, caged nut assemblies, and panel fasteners.

BACKGROUND

In case of high performance structures, such as those intended for Aircrafts and Aerospace vehicles, the issue of Fastener Hole Quality is of great importance. Great care is required to prepare holes with precise dimensions and proper surface finish such that the structure (or work piece) can properly engage with the fastener. This proper preparation is intended to keep the hole and surrounding structure free from flaws such as Scratches, Undercuts, Burrs and other forms of discontinuities. In the case of Composite structures the issue of good hole quality is even more significant and harder to achieve.

Hole size and quality has a significant effect on fatigue life of the structural joints. Examination of fatigue type failures of aircraft structures indicate that fatigue failures are often initiated in regions where the structure interfaces with fasteners. It has also been shown that a proper amount of compressive residual stress induced by radial interference of an installed fastener improves structural fatigue life by resisting crack formation at the hole. It is therefore very important to employ procedures that prepare quality holes, and select fasteners with specific features for proper joint design, such that the structural joint can resist dynamic loading and enhance the fatigue life of the structure.

During the process of initial hole preparation, errors in manufacturing may cause a hole to be drilled oversized, non-symmetrical, or with surface flaws. Also, during the service life of the structure, it is often necessary to remove and replace installed fasteners to repair a joint, or individual fastener, showing signs of damage. During the fastener removal process the hole is often damaged. In both of these cases the standard size hole is often drilled to a larger diameter that can accommodate a non-standard oversized fastener. The economic impact of this is significant as oversized fasteners are expensive and often not readily available.

Another acceptable practice is to attach a thin wall cylindrical insert in the hole, most often with a bonding agent, and then install the fastener within this insert. The challenges involved with this approach are that of dimensioning the insert, the fastener, and the hole such that an intimate contact of adequate interface strength is kept within all the components. Due to dimensioning and manufacturing tolerances of this type of solution, relative movement of components within the structure may occur, leading to a reduction in structural fatigue life.

Consequently, a new fastener design, which alleviates the problems described above and allows for insertion into an oversized or reworked/reconditioned aperture in a structure or work piece, is needed.

SUMMARY

One feature is directed to a fastener for insertion into an aperture of a work piece. The fastener comprises an expander pin having a first pin end and a second pin end opposite the first pin end; and an insert sleeve. The expander pin comprises a main body portion and a tail portion. The main body portion comprises a top portion; an initial expander rings section having a series of expander annular rings; and a final expander pin head section integrally connected between the top portion and the initial expander rings section. The tail portion comprises a push rod section extending from the first pin end to the top portion of the main body portion.

The insert sleeve has a first sleeve end and a second sleeve end and comprises a cylindrical sleeve portion having an outer wall and an inner wall having a series of inner wall annular rings; and an opening, extending between the first sleeve end and the second sleeve end, adapted for receiving the expander pin; and wherein the series of inner wall annular rings are formed into the series of expander annular rings.

In one aspect, a surface of the outer wall is selected from at least one of smooth, a series of outer wall annular rings, waves, threads and concentric knurls.

In another aspect, the series of inner wall annular rings comprise first diameter rings and second diameter rings, and wherein a diameter of a ring in the first diameter rings is larger than a diameter of a ring in the second diameter rings. A surface of the inner wall transitioning between the first diameter rings and the second diameter rings is smooth.

In yet another aspect, the series of expander annular rings comprise first diameter rings and second diameter rings, and wherein a diameter of a ring in the first diameter rings is larger than a diameter of a ring in the second diameter rings. A surface of the initial expander rings section transitioning between the first diameter rings and the second diameter rings is smooth.

In yet another aspect, a diameter of the final expander pin head section is larger than diameters of rings in the series of expander annular rings of the initial expander rings section.

In yet another aspect, the fastener is a push type fastener and the sleeve head is a radial flange.

In yet another aspect, the outer wall of the cylindrical sleeve portion comprises external threading and wherein a composite adaptor spring is threadingly engaged to the outer wall. The external threading of the outer wall has the same pitch as threading on the composite adaptor spring.

In yet another aspect, a portion of the final expander pin head is located outside the sleeve head.

Another feature is directed to a fastener for insertion into an aperture of a work piece. The fastener includes an expander pin having a first pin end and a second pin end opposite the first pin end; and an insert sleeve. The expander pin comprises a main body portion and a tail portion. The main body portion comprises an expander pin head; and an initial expander rings section, having a series of expander annular rings, integrally connected between the expander pin head. The tail portion, integrally connected to the initial expander ring section of the main body, comprise a top spacer section; and a pulling serration section integrally connected to the top spacer section.

The insert sleeve, having a first sleeve end and a second sleeve end, the first sleeve end having a sleeve head, comprises a cylindrical sleeve portion having an outer wall and an inner wall having a series of inner wall annular rings; and an opening, extending between the first sleeve end and the second sleeve end, adapted for receiving the expander pin; and wherein the series of inner wall annular rings are formed into the series of expander annular rings.

In one aspect, a surface of the outer wall is selected from at least one of smooth, a series of outer wall annular rings, waves forward threads, backward threads and concentric knurls.

In another aspect, the series of expander annular rings comprise first diameter rings and second diameter rings, and wherein a diameter of a ring in the first diameter rings is larger than a diameter of a ring in the second diameter rings. A surface of the initial expander rings section transitioning between the first diameter rings and the second diameter rings is smooth.

In yet another aspect, the series of inner wall annular rings comprise first diameter rings and second diameter rings, and wherein a diameter of a ring in the first diameter rings is larger than a diameter of a ring in the second diameter rings. A surface of the inner wall transitioning between the first diameter rings and the second diameter rings is smooth.

In yet another aspect, the fastener is a pull type fastener.

In yet another aspect, a portion of the expander pin head is located outside the sleeve head.

BRIEF DESCRIPTION OF THE DRAWINGS

Various features, nature and advantages may become apparent from the detailed description set forth below when taken in conjunction with the drawings in which like reference characters identify correspondingly throughout.

FIGS. 9A through 9E illustrate the process of installing a blind pull type assembled fastener within a work piece or structure, in accordance with one aspect of the present invention.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail, so as not to unnecessarily obscure aspects of the invention.

Overview

In one aspect of the present invention, a self-integrating insert sleeve assembly for insertion into an aperture of a work piece is provided. The self-integrating insert sleeve assembly is an assembled fastener that comprises an insert sleeve and an expander pin. Upon installation, the insert sleeve component is radially expanded by interaction with the pin, and secured to the aperture of the work piece, such that the resulting aperture of the installed insert sleeve has a predetermined diameter, and the resulting structure now contains compressive residual stresses. Thus, the installed insert sleeve may be employed as a hole repair solution, allowing for the installation of an original size fastener per structural design within a damaged and reconditioned aperture, or simply for enhanced structural fatigue life. The installation of this insert sleeve may be done through various manners, including pull type, push type, and blind type installation processes. Additionally, securing the insert sleeve into a work piece, as described herein, allows for the attachment of various components to the work piece such as caged nut assemblies and panel fasteners.

Exemplary Insert Sleeve

Figures 1A, 1B:
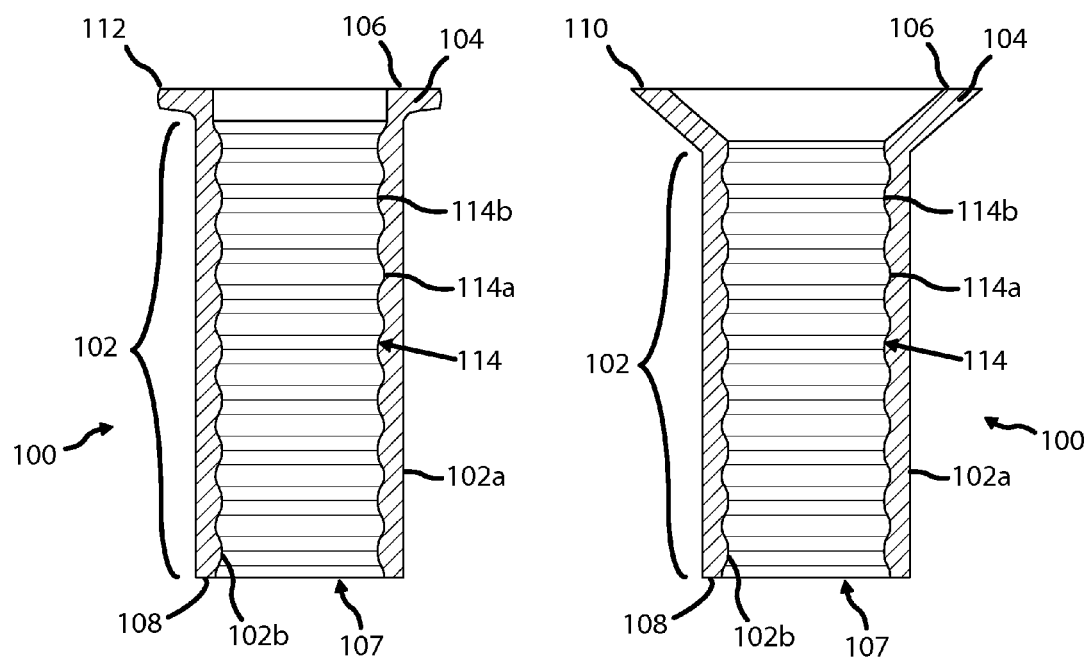
FIGS. 1A and 1B illustrate cross sectional side views of insert sleeves, in accordance with one aspect of the present invention.

FIGS. 1A and 1B illustrate cross sectional side views of insert sleeves 100, in accordance with one aspect of the present invention. As shown in both figures, an insert sleeve 100 may include an elongated hollow cylindrical (or tubular) sleeve portion (or shank) 102 terminating at a first sleeve end 106, in a sleeve head 104, and a second sleeve end 108. The sleeve head 104 may be in the form of, including but not limited to, a flush head 110 (i.e. flat across the surface), as seen in FIG. 1B, or a protruding/counter bore head 112, as seen in FIG. 1A.

The cylindrical sleeve portion 102 may have an outer 102$a$ wall (or geometry) and an inner wall 102$b$ (or geometry) defining an opening 107 in the sleeve 100. The opening 107 extends between the first sleeve end 106 and the second sleeve end 108 and is adapted to receive an expander pin 200 as described below (See FIG. 2).

The overall external geometry of the outer wall 102$a$ is designed to improve engagement of the sleeve 100 with a work piece after installation and may be, for example, smooth, comprised of a series of annular rings, waves, threads, concentric knurls, or any combination thereof.

As described above, the opening 107 may extend from the first sleeve end 106 to the second sleeve end 108 defining an aperture, having an inner wall 102$b$, in the insert sleeve 100. In one aspect, the geometry of the inner wall 102$b$ may contain a series of annular rings 114 comprising first diameter rings 114$a$ adjacent to second diameter rings 114$b$ where the diameters of the first diameter rings 114$a$ are larger than the diameters of the second diameter rings 114$b$. According to one aspect, the transition from ring to ring is smooth. Thus, the geometry of the inner wall 102$b$ is sinusoidal and axially symmetric and designed to engage and integrate with the geometry (i.e. initial expander rings section 214 as described below) of the expander pin 200. The profile of this inner wall 102*b* may however be comprised of many different shapes, including threads, as required by the function of the insert.

Exemplary Expander Pin

Figure 2:
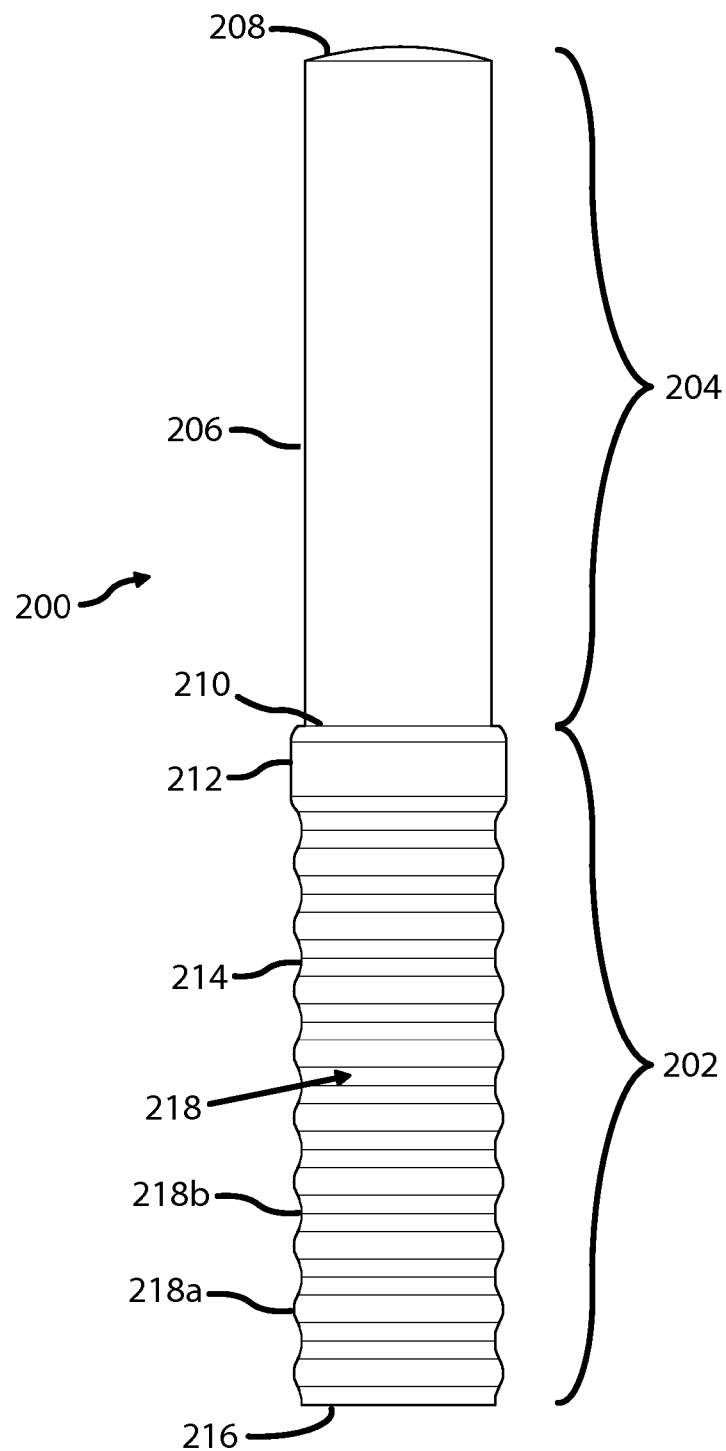
FIG. 2 illustrates a side view of a push-type expander pin, in accordance with one aspect of the present invention.

FIG. 2 illustrates a side view of a push-type expander pin 200, in accordance with one aspect of the present invention. The push-type expander pin 200 includes a main body portion 202 integrally connected to a tail portion 204. The tail portion 204 comprises a push rod section 206 extending from a first pin end 208 to a top portion 210 of the main body 202. The main body 202 includes a final expander pin head 212 integrally connected to an initial expander rings section 214 that terminates at a second pin end 216, described in further detail below.

The initial expander rings section 214 may comprise a series of annular rings 218 comprising first diameter rings 218*a* adjacent to second diameter rings 218*b* where the diameters of the first diameter rings 218*a* are larger than the diameters of the second diameter rings 218*b*. According to one aspect, the transition from ring to ring is smooth. Although the geometry of the initial expander rings section 214 is sinusoidal and axially symmetric such that it closely matches and nestles (i.e. engages and integrates) within the annular rings 114 of the insert sleeve 100 after assembly of the insert sleeve 100 and expander pin 200 (See FIG. 3), this is by way of example only and the geometry may be formed of other shapes as required by the function of the fastener.

As shown, the final expander pin head section 212 has a diameter slightly larger than the diameters of the annular rings 218 of the initial expander rings section 214 and the annular rings 114 of the insert sleeve 100. Upon installation, the final expander pin head section 212 provides the final expansion forces and finished diameter to the insert sleeve 100.

Figure 4:
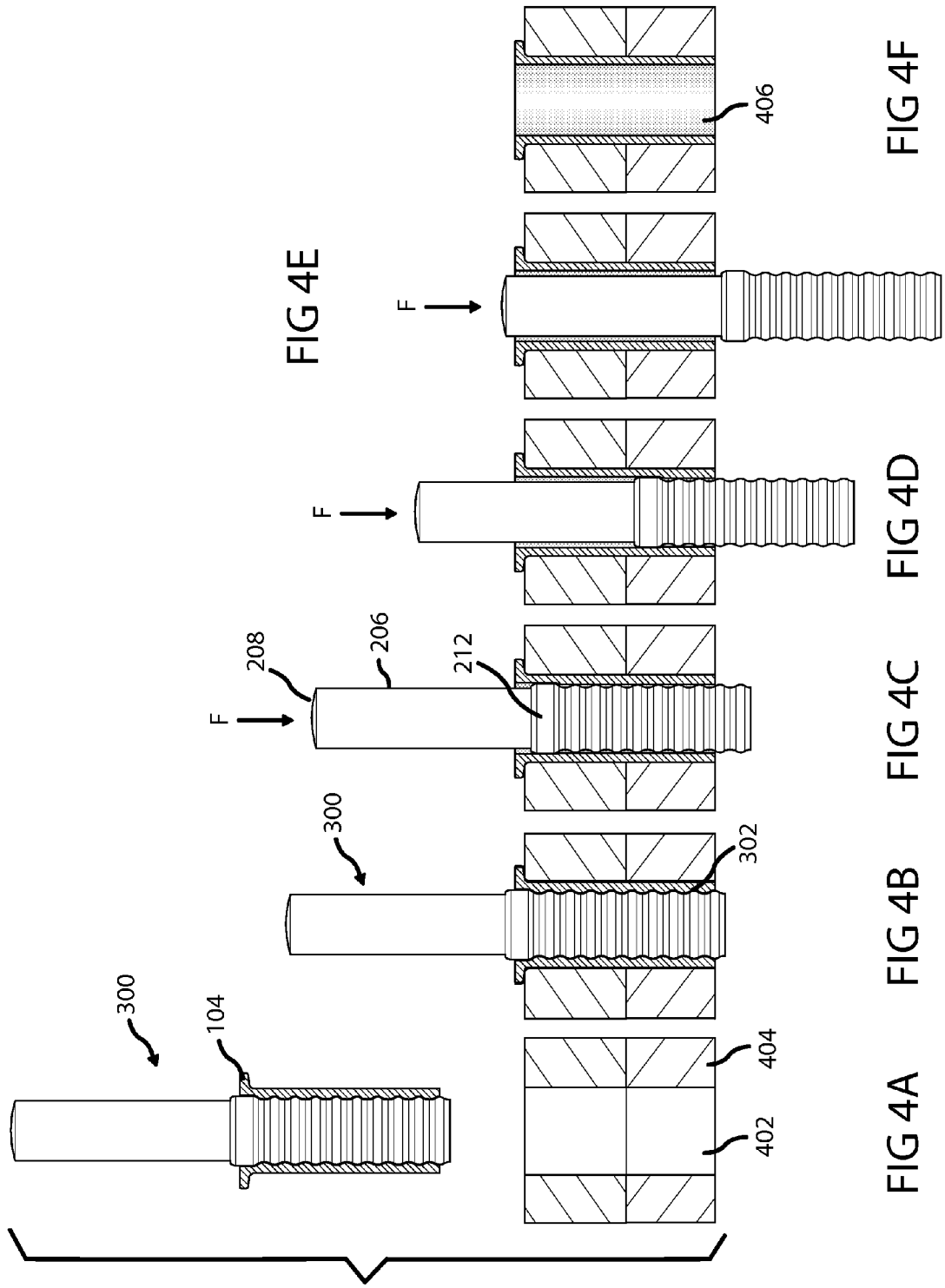
FIGS. 4A through 4F illustrate the process of installing a push type assembled fastener within a work piece or structure, in accordance with one aspect of the present invention.

When installing the push-type expander pin 200 in the sleeve 100, an installation tool, as known in the art, may be used to provide an axial force to the push rod section 206. According to one aspect, the push rod section 206 may be long enough such that the first pin end 208 continues to protrude beyond the first sleeve end 106 after the final expander pin head section 212 has been forced completely through the insert sleeve 100 during installation (See FIG. 4). As a result, the installation tool does not make contact with or damage the structure work piece and no precision alignment is required.

Exemplary Assembled Push Type Fastener

Figure 3:
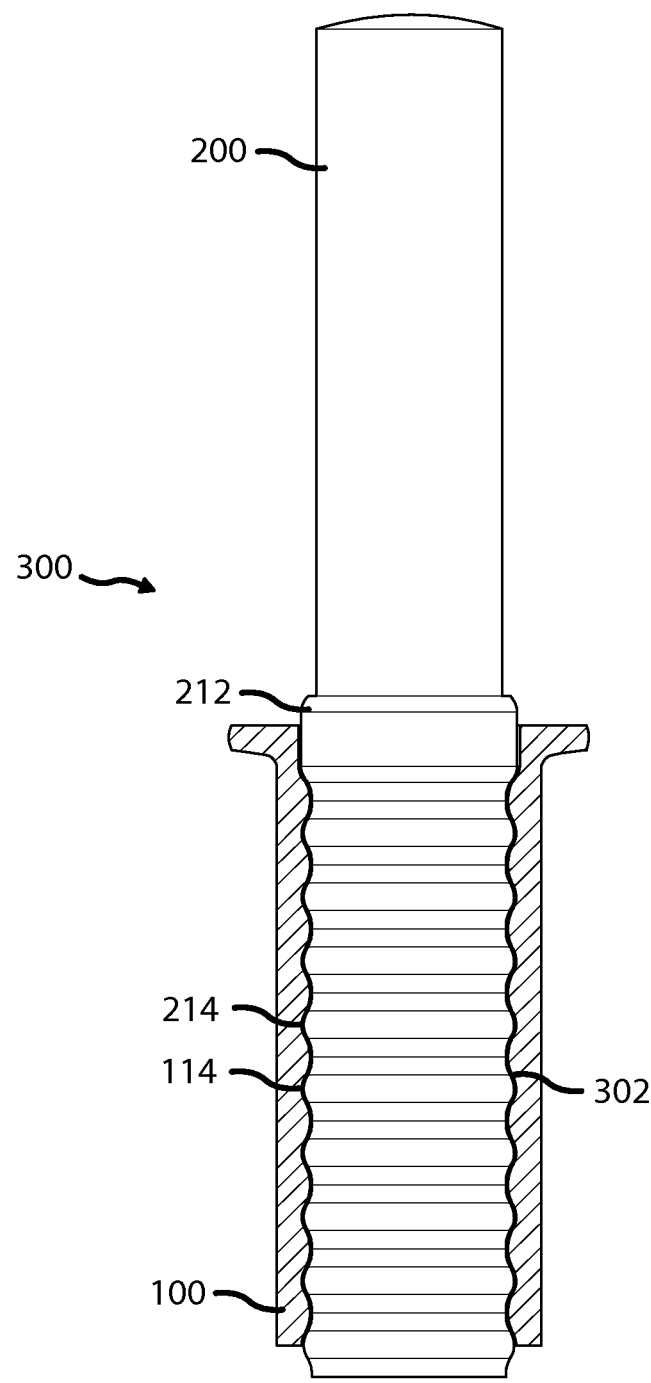
FIG. 3 illustrates a cross-sectional view of an assembled push type fastener, according to one aspect of the present invention.

FIG. 3 illustrates a cross-sectional view of a push type assembled fastener 300, according to one aspect of the present invention. The push type assembled fastener comprises of an insert sleeve 100 surrounding the push type expander pin 200 such that the insert sleeve inner wall geometry 114 and the initial expander rings pin section 214 geometry closely match and nestle (i.e. engage and integrate) each other 302. As a result of the closely matched and nestled geometry, the final expander pin head 212 of the push type expander pin 200 may be located slightly outside the sleeve head 104.

The fastener 300 may be assembled with a straight walled tubular sleeve (having the desired sleeve head 104, such as a protruding or flush head, but initially lacking the annular ring geometry 114) that is swaged onto the expander pin 200 such that the sleeve portion (or shank) 102 is radially reduced. As a result of the swaging, the series of annular rings 114 on the inner wall 102*b* of the sleeve may be formed into the series of annular rings 218 of the initial expander rings section 214 of the pin 200 such that the series of annular rings 114 of the sleeve 100 may closely match (i.e. engage and integrate with) the series of annular rings 218 of the pin 200.

According to one embodiment, it may also be possible to assemble the fastener using a split sleeve, where the final insert sleeve is formed by stamping the annular rings 114 and desired sleeve head 104 on a flat piece of material. This material can then be wrapped into a tubular shape around the expander pin 200.

Exemplary Push Type Fastener Installation

FIGS. 4A through 4F illustrate the process of installing a push type assembled fastener within a work piece or structure, in accordance with one aspect of the present invention. As shown in FIGS. 4A and 4B, the assembled fastener 300 may be placed in a prepared aperture 402 in the work piece 404 such that the sleeve head 104 of the fastener 300 may come in contact with the work piece 404. Once the fastener 300 has been placed in the aperture 402, an installation tool, as known in the art, provides an axial force to the push rod section 206 at the first pin end 208, seen in FIGS. 4C through 4E as an arrow with an F force indicator, resulting in a relative axial movement between the pin 200 and the insert sleeve 100. The axial movement between the pin 200 and the insert sleeve 100 causes the nestled geometry 302 of the insert sleeve inner wall geometry 114 and the initial expander rings pin section 214 geometry to deform such that when the pin 200 is moved axially, the sleeve inner wall geometry 114 is forced radially outward at each increment of interaction, i.e. each ring in the serrations. As a result, the entire insert sleeve expands radially outward into the aperture 402 of the work piece 404, forming a fixed relationship between the installed insert sleeve 100 and work piece 404, as well as inducing the desired residual compressive stresses into the structure.

With continued axial force placed on the push rod section 206 which causes movement of the pin 200, the final expander pin head section 212 is forced through the aperture of the sleeve 100 providing a final expansion, while burnishing (i.e. the act of smoothing or polishing due to sliding contact between medals) the inner diameter of the insert sleeve to the final required aperture diameter 406, completing the installation of the push-type self-integrating structural insert sleeve for hole repair. Thus, the completed installation sequence leaves only the precisely expanded and burnished insert sleeve within the structure, as seen in FIG. 4F.

Exemplary Pull Type Expander Pin

Figure 5:
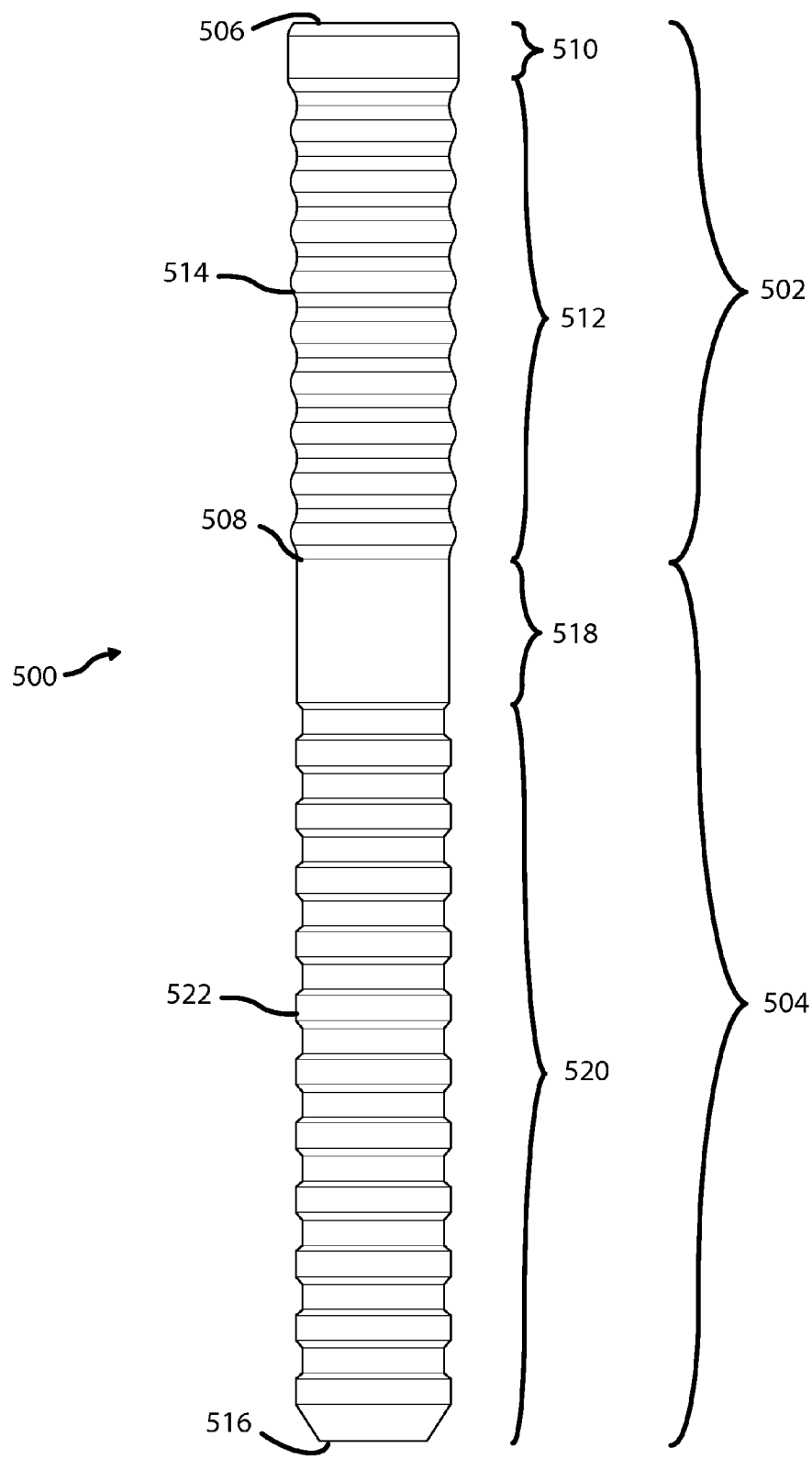
FIG. 5 illustrates a side view of a pull type expander pin, in accordance with one aspect of the present invention

FIG. 5 illustrates a side view of a pull type expander pin 500, in accordance with one aspect of the present invention. Similar to the push type expander pin 200 of FIG. 2, the pull type expander pin 500 includes a main body portion 502 and a pull tail section 504. The main body portion 502 extends from a first end section 506 to a bottom of main body portion 508 and contains a final expander pin head 510 integrally connected to an initial expander rings section 512 having a series of annular rings 514. The pull tail section 504 extends from the bottom of the main body portion 508 to the second pin end 516. This pull tail section 504 comprises a top spacer section 518 and terminates in a pulling serration section 520. The pulling serrations section 520 may be of an industry standard design for interacting with a pulling tool as known in the art. A series of serrations (or grooves or threads) 522 in the pulling serrations section 520 may be utilized for interacting with an installation tool.

Exemplary Assembled Pull Type Fastener

Figure 6:
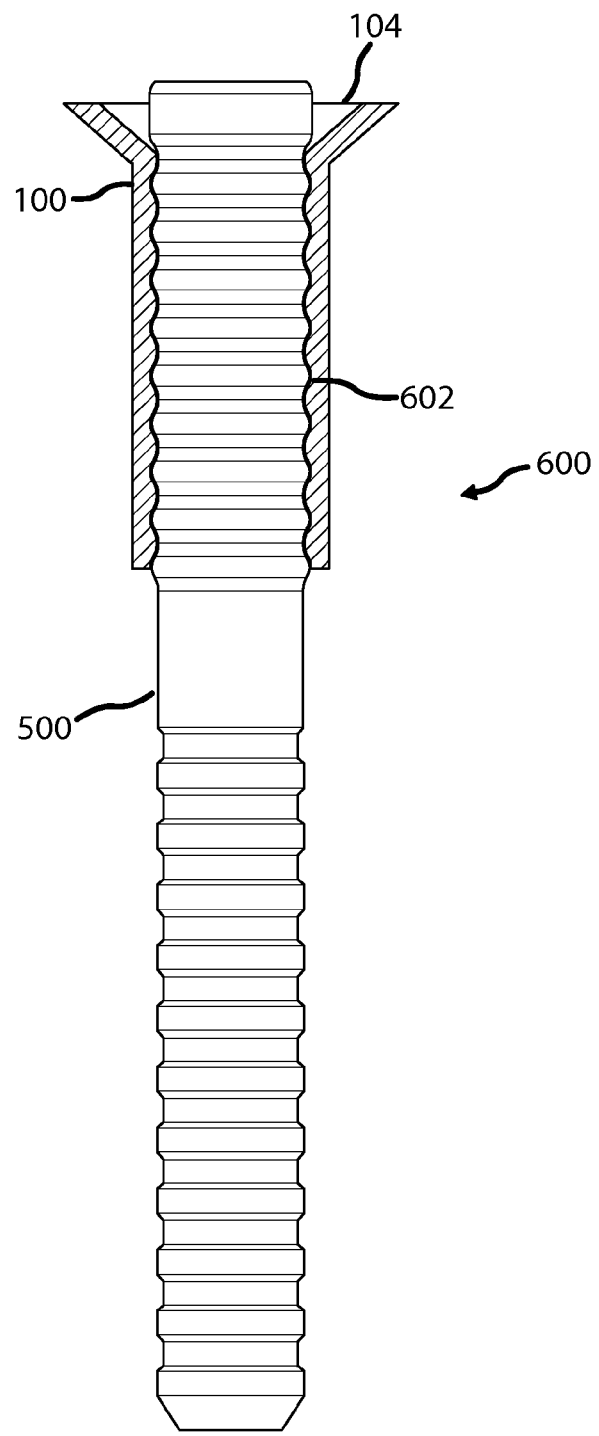
FIG. 6 illustrates illustrate a side cross-sectional view of a pull type assembled fastener, according to one aspect of the present invention.

FIG. 6 illustrates a side cross-sectional view of a pull type assembled fastener 600, according to one aspect of the present invention. As shown, an insert sleeve 100 can be utilized with the pull type expander pin 500 to create an assembled pre-installed pull type self-integrating structural insert sleeve (or assembled pull type fastener) 600.

The assembled pull type fastener is comprised of an insert sleeve 100 surrounding the pull type expander pin 500 of FIG. 5 such that the insert sleeve inner wall geometry 112 and the initial expander rings pin section 512 geometry 512 (i.e. series of serrations) closely match and nestle (i.e. engage and integrate with) each other 602. Orientation of the fastener may be such that the pin head 510 of the pull-type expander pin 500 may be located slightly outside the sleeve head 104.

Exemplary Pull Type Fastener Installation

Figures 7A, 7B, 7C, 7D, 7E:
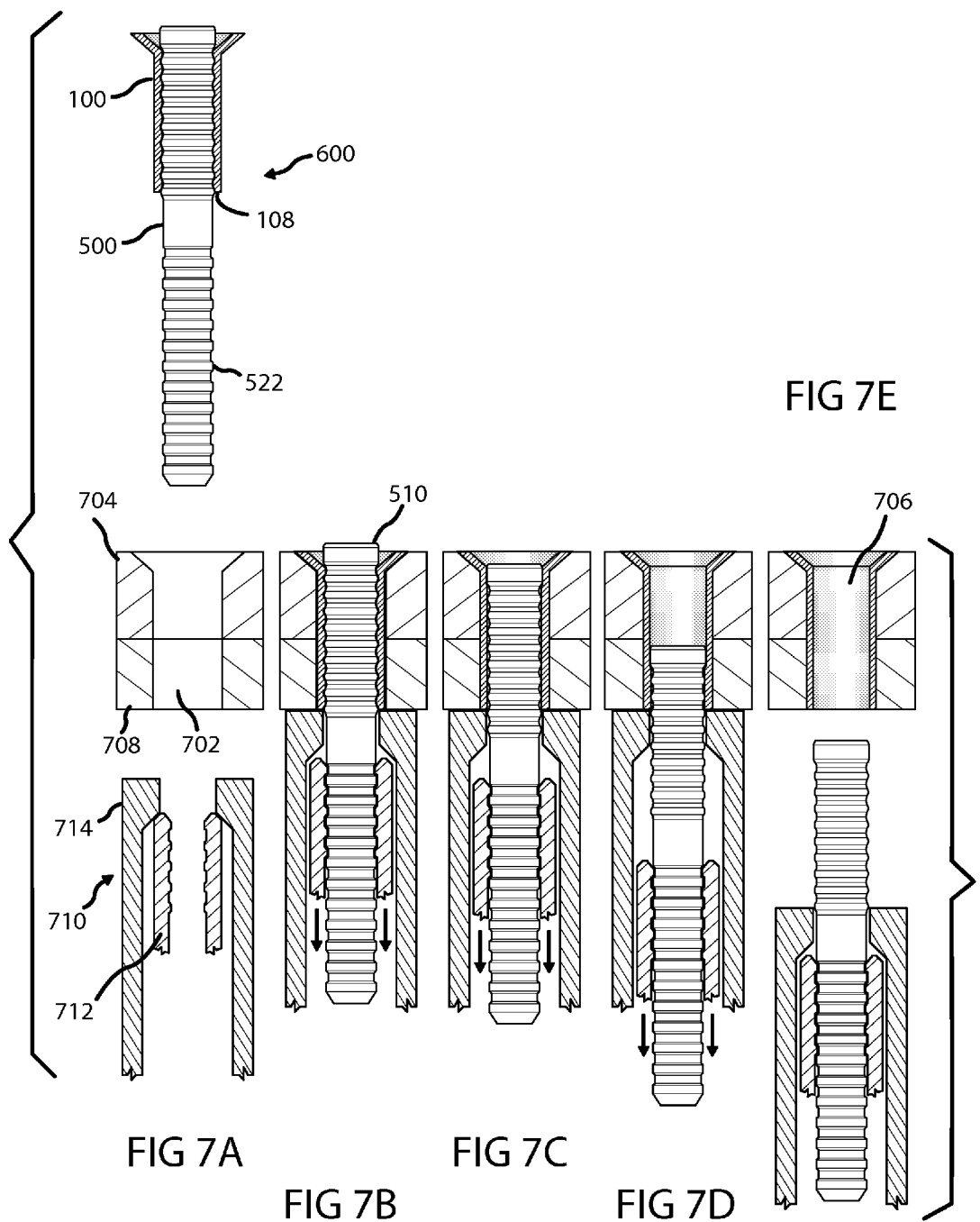
FIGS. 7A through 7E illustrate the process of installing the assembled pull type fastener within a work piece or structure, in accordance with one aspect of the present invention.

FIGS. 7A through 7E illustrate the process of installing the assembled pull type fastener within a work piece or structure, in accordance with one aspect of the present invention. As shown in FIG. 7A, the assembled fastener 600 may be placed in a prepared aperture 702 of a work piece or other structure 704 from one side while a pulling tool 710, as known in the art, is prepared on the other. Jaws 712 of the pulling tool 710 engage with the pulling serration section 520 from the backside of the work piece 704, as seen in FIG. 7B, providing the necessary axial force to move the pull type expander pin 500 in relation to the insert sleeve 100, as seen in FIGS. 7C through 7D. As the pull type expander pin 500 moves within the insert sleeve 100, the insert sleeve 100 radially expands generating the desired residual compressive stresses to the structure 704 and becoming fixed within the work piece aperture 702 as described previously.

With continued axial pulling force on the pulling serrations section 520 and movement of the pin 500, the pin head 510 is forced through the aperture of the sleeve 100 providing a final expansion, and burnishing the inner diameter of the insert sleeve 100 to the final required aperture diameter 706, completing the installation of the pull type self-integrating structural insert sleeve 600. Thus, FIG. 7E shows the installed insert sleeve fixed within the structure just after installation.

According to one aspect, the nosepiece 714 of the pulling tool may be used to retain the sleeve end 108 flush with the backside of the work piece surface 708 throughout the installation process of the pull type self-integrating structural insert sleeve 600 providing engagement between the installed insert sleeve 100 and the work piece aperture 702 while preventing potential elongation of the insert sleeve 100 beyond the backside of the work piece 704.

Blind Pull Type Assembled Fastener

Figure 8:
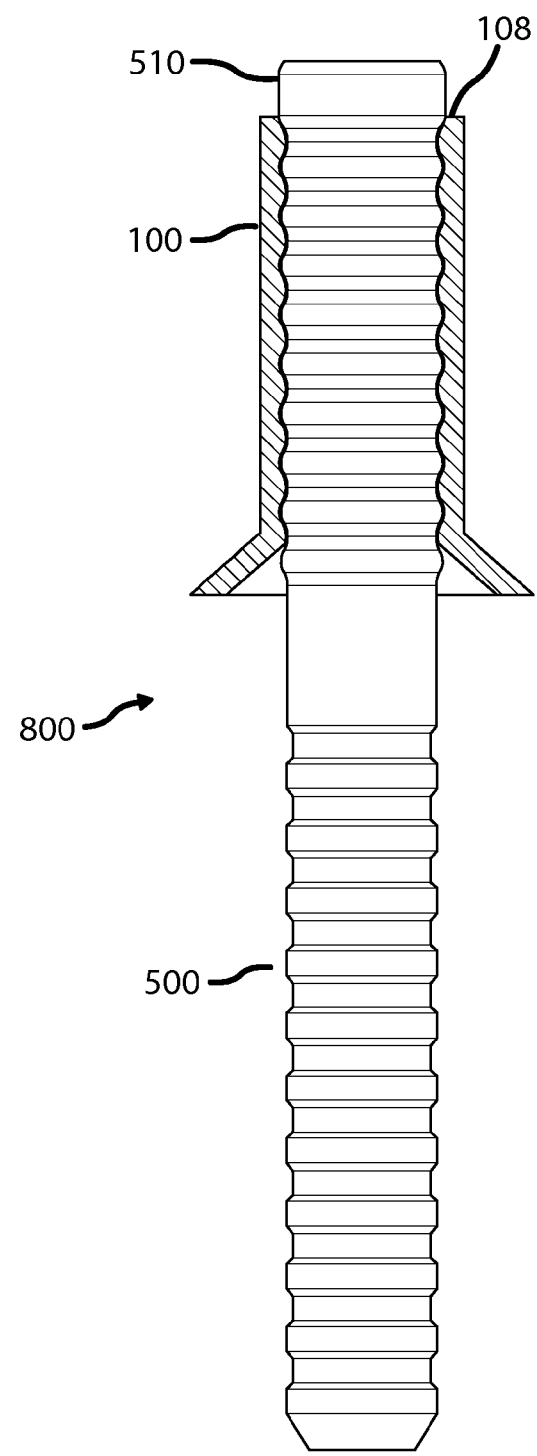
FIG. 8 illustrates a cross sectional view of a blind pull type assembled fasteners, according to an aspect of the present invention.

FIG. 8 illustrates a cross sectional view of a blind pull type assembled fastener 800, according to an aspect of the present invention. The blind pull type assembled fasteners are comprised of insert sleeves 100 and pull type expander pins 500. To assemble the blind pull type fastener 800, the insert sleeve 100 is assembled on the expander pin 500 in the opposite orientation as previously described. As a result, the pin head 510 is located slightly beyond the second sleeve end 108 such that access to only one side of a work piece is needed for installation.

Exemplary Blind Pull Type Fastener Installation

FIGS. 9A through 9E illustrate the process of installing a blind pull type assembled fastener within a work piece or structure, in accordance with one aspect of the present invention. The assembled blind pull type fastener 800 may be placed in a prepared aperture 902 of the work piece 904, as seen in FIG. 9A. The pulling tool 710 is used to provide an axial force resulting in relative axial movement of the pin 500 which causes the insert sleeve 100 to radially expand into the structure 904, generating the desired compressive residual stresses and becoming fixed within the work piece aperture 902, as described previously and shown in FIGS. 9B through 9D.

With continued axial pulling force on the pulling serrations section 508, the pin head 502 is forced through the aperture of the sleeve 100 providing a final expansion, and burnishing the inner diameter of the insert sleeve 100 to the final required aperture diameter 906, thus completing the installation of the pull-type self-integrating structural insert sleeve 800. FIG. 9E shows the installed insert sleeve fixed within the structure 904 after installation.

Exemplary Insert Sleeve Having Radial Flange

Figure 10A:
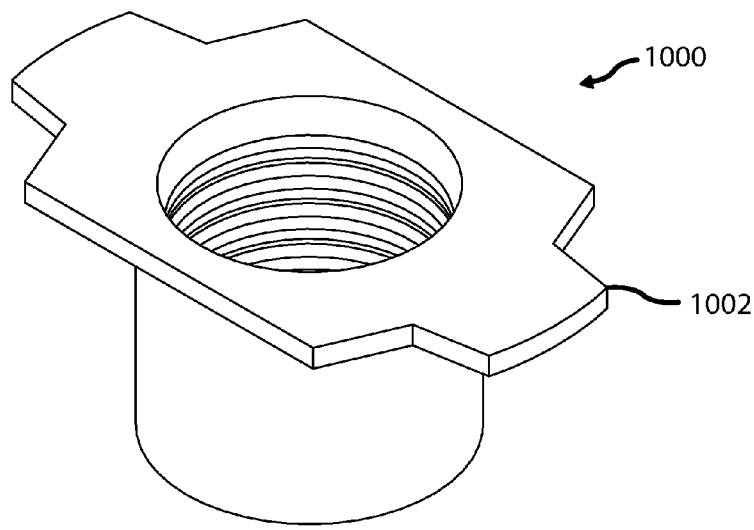
FIGS. 10A and 10B illustrate an insert sleeve having an enlarged head, such as a radial flange, 1002 for use with a caged nut assembly, or for use with a replaceable snap or nut, in accordance with one aspect of the present invention.
Figure 10B:
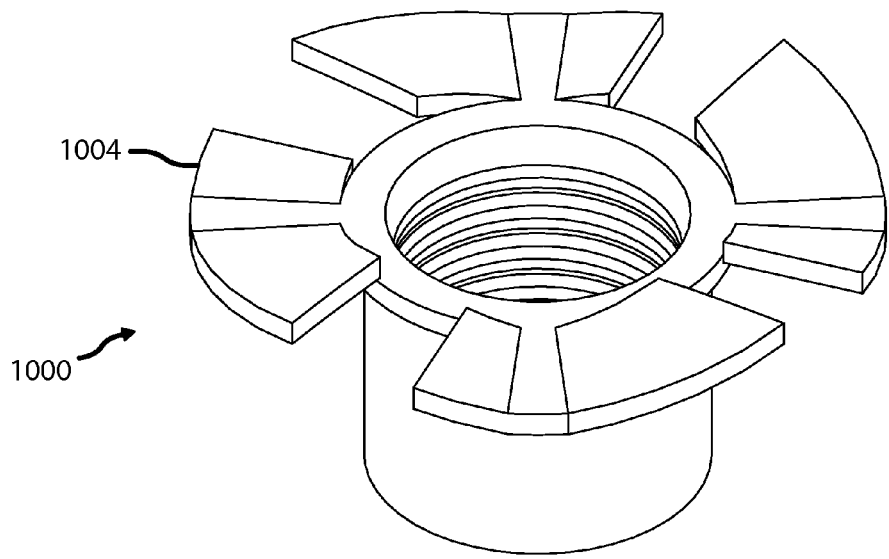

FIGS. 10A and 10B illustrate insert sleeves 1000 having an enlarged, non uniform or non cylindrical heads. FIG. 10A shows a radial flange head, 1002 for use with a caged nut assembly, while FIG. 10B shows a head style 1004 for use with a replaceable snap or nut, in accordance with certain aspects of the present invention.

Using the insert sleeve 1000 with the radial flange 1002 of FIG. 10A and either a push type expander pin 200 or a pull type expander pin 500, a panel fastener can be attached to a structure through an aperture in the work piece. The geometry of the radial flange 1002 allows the insert sleeve to capture any necessary components of a panel fastener, such as a caged nut assembly.

Using the insert sleeve 1000 with the radial flange 1004 of FIG. 10B and either a push type expander pin 200 or a pull type expander pin 500, an easily replaceable snap or nut can be attached to a structure such that material of the snap or nut nestles into the voids of the flange head 1004. Thus, using the insert sleeve head as an attachment point for panel fastener components, many radial flange geometries may be conceived for many unique applications.

Figure 11:
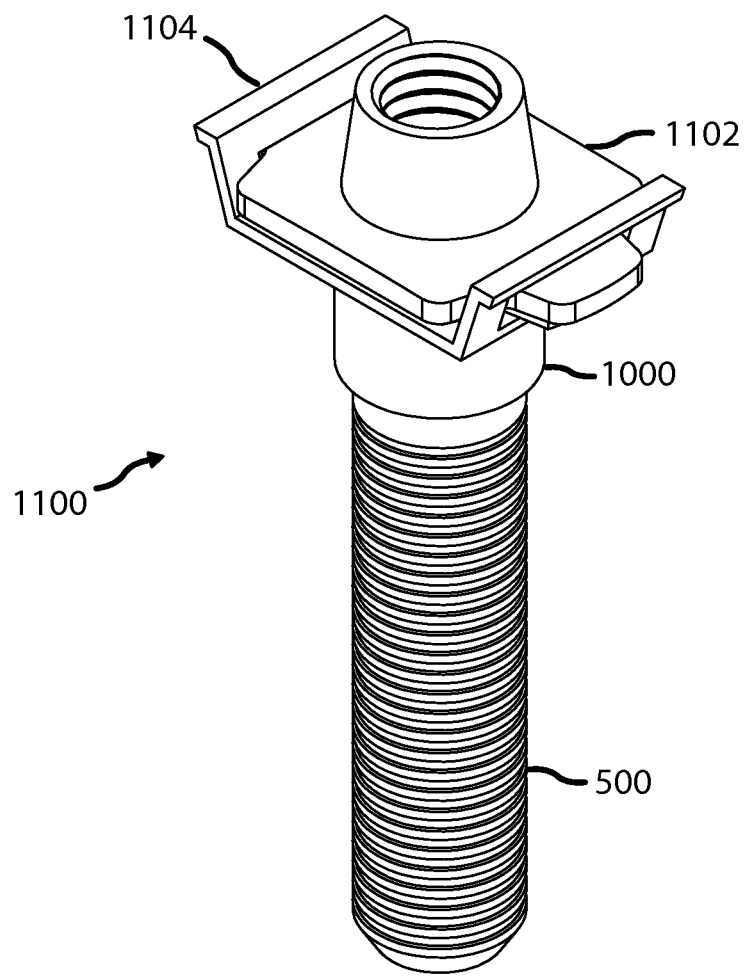
FIG. 11 illustrates an assembled insert sleeve captured nut assembly, in accordance with one aspect of the present invention.
Figure 12:
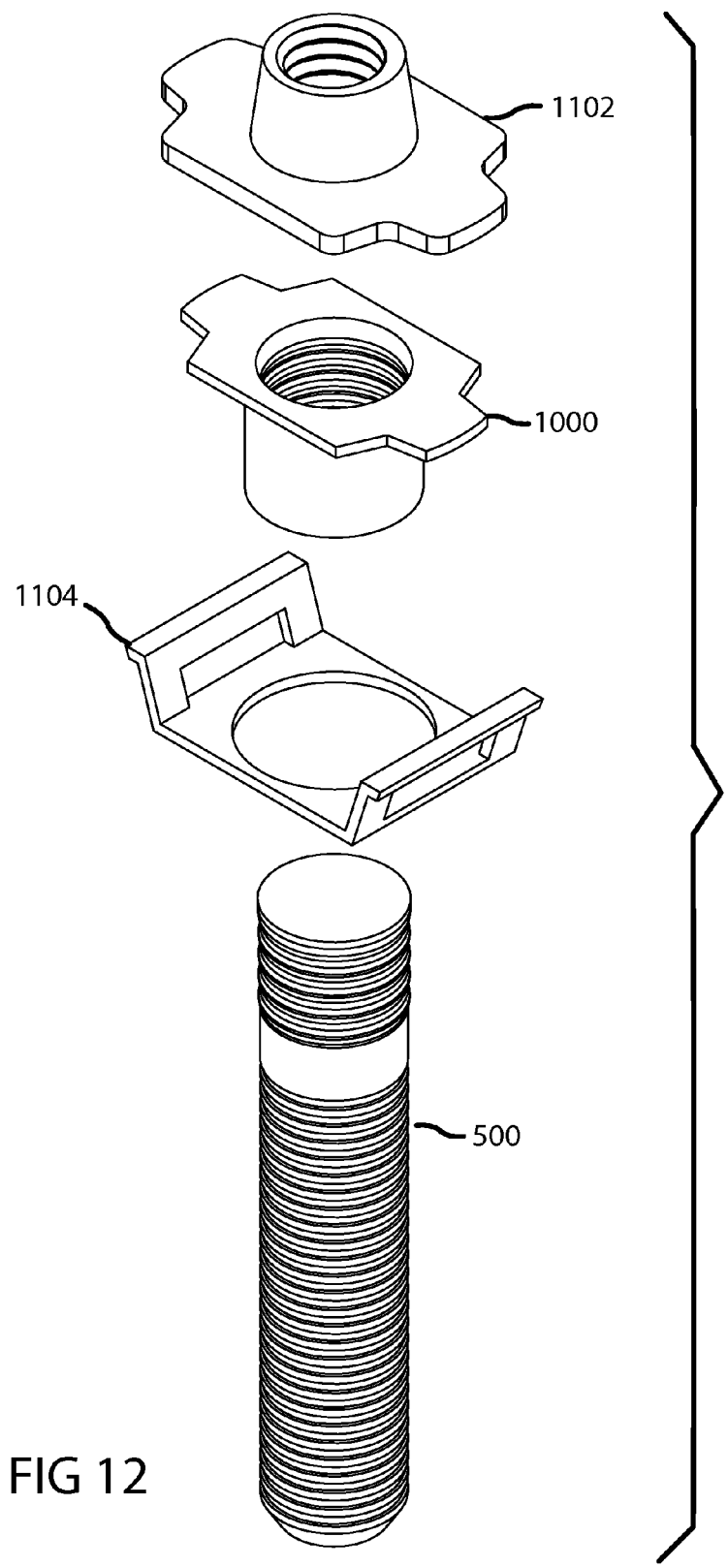
FIG. 12 illustrates an exploded view of the insert sleeve captured nut assembly of FIG. 11.

FIGS. 11 and 12 illustrate an assembled and an exploded view of an insert sleeve captured nut assembly 1100, respectively. As shown, the insert sleeve caged nut assembly 1100 may comprise a floating nut 1102, a cage 1104, the insert sleeve 100, and the expander pin 500. Upon installation of the insert sleeve 100 to the work piece, the radial flange 1002 traps and secures the base of the cage 1104 to the work piece, which in turn houses the floating nut 1102. As a result, the floating nut 1102 can be used with a standard bolt.

Additionally, a cap nut or dome component, as known in the art, may be added to the panel fastener to make the captured nut assembly capable of wet installations, such as in fuel tanks, where it is important that no liquid escape out of the drilled aperture in the work piece or through any path of the installed fastener. This is considered a sealing type fastener.

Insert Sleeve Having Composite Adaptor Spring

Figure 13:
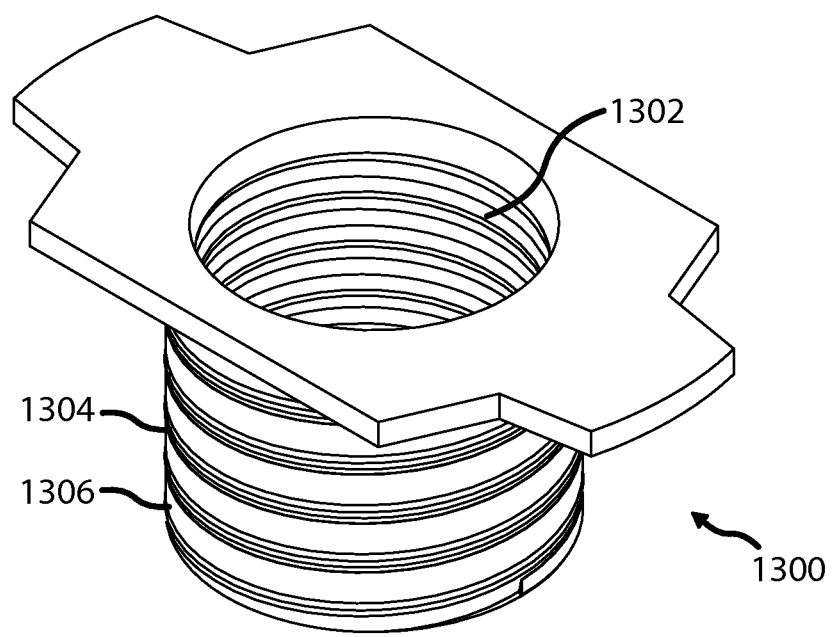
FIG. 13 illustrates an insert sleeve assembled with a composite adaptor spring, in accordance with one aspect of the present invention.
Figure 14:
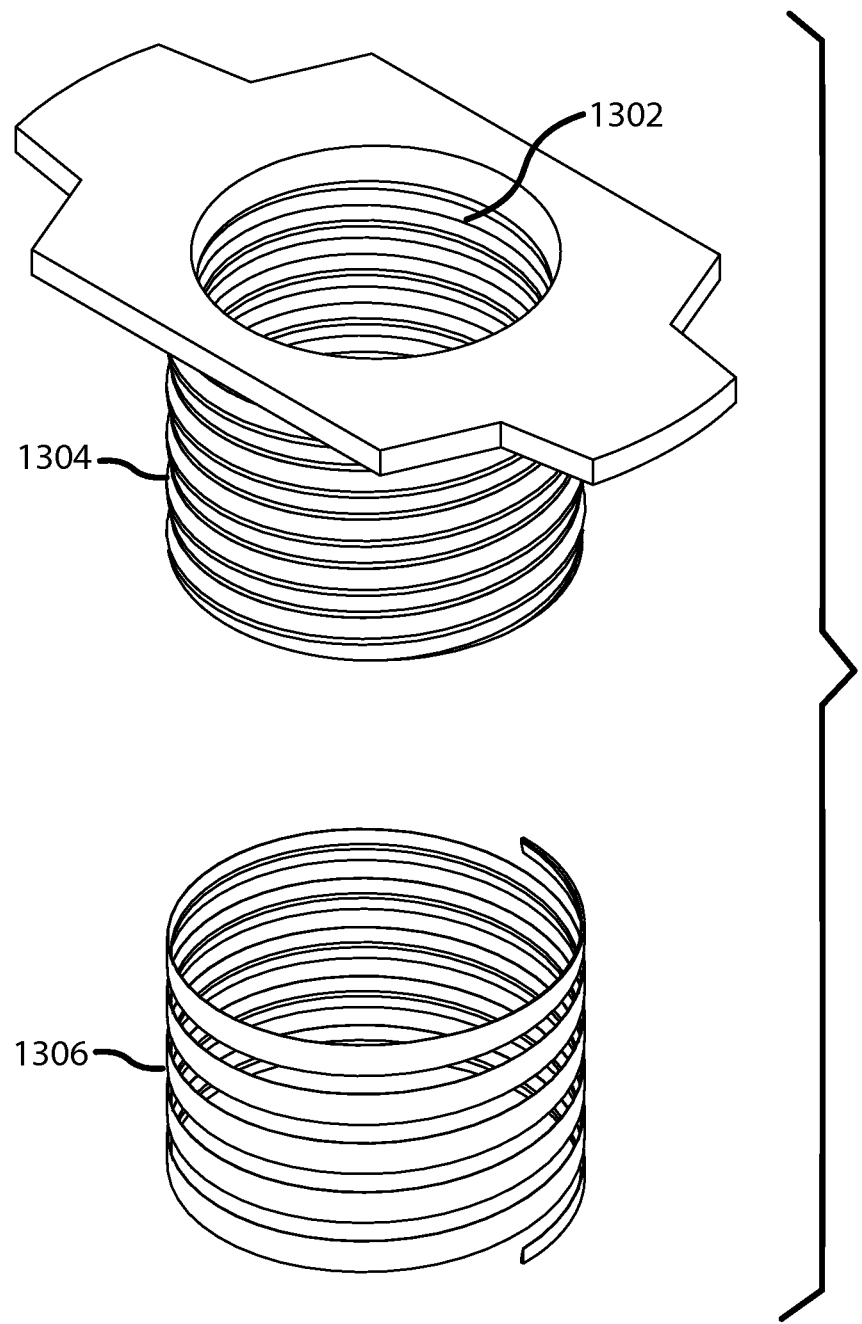
FIG. 14 illustrates an exploded view of the insert sleeve of FIG. 13.

FIGS. 13 and 14 illustrate an assembled and an exploded view of an insert sleeve having a composite adaptor spring, in accordance with one aspect of the present invention. The insert sleeve having a composite adaptor spring may be used for repairing a hole in, or attaching a fastener to, a composite structure.

As shown, the insert sleeve 1300 has internal 1302 and external 1304 threading as well as a spring 1306 of soft allow material, such as CP-Ti, soft nickel, or other malleable material, having the same pitch as the external threading 1304 of the sleeve 1300. The spring 1306 is threaded onto the outside of the insert sleeve 1300 and, if necessary, secured by silver solder or other similar joining method. This subassembly can then be threaded onto either a push type expander pin 200 or pull type expander pin 500 with matching threading, such that the internal threads 1302 of the insert sleeve 1300 engage the expander pin threading. The resulting fastener would be similar to that shown in FIGS. 11 and 12. Installation will take place similar to previously described, where the assembled unit is located in the aperture of the work piece, and the pin is pulled. The sleeve head engages the surface of the work piece to prevent the sleeve from moving axially in relation to the work piece while the pin is pulled. Further pulling forces the pin to move axially in relation to the sleeve, forcing the sleeve to expand radially outward into the spring and structure, and forcing the deformation of the spring such that the sleeve, spring, and work piece are integrally joined together.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. An insert type fastener for insertion into an aperture of a work piece, comprising:
    an expander pin having a first pin end and a second pin end opposite the first pin end, the pin comprising:
        a main body portion, the main body portion comprising:
            a top portion;
            an initial expander rings section having a series of expander annular rings; and
            a final expander pin head section integrally connected between the top portion and the initial expander rings section; and
        a tail portion comprising an elongated smooth cylindrical push rod section extending from the first pin end to the top portion of the main body portion; and
    an insert sleeve having a first sleeve end and a second sleeve end, the first sleeve end having a sleeve head, the insert sleeve comprising:
        a cylindrical sleeve portion having an outer wall and an inner wall having a series of inner wall annular rings, the series of inner wall annular rings integrated within the series of expander annular rings prior to installation into the work piece; and
        an opening, extending between the first sleeve end and the second sleeve end, adapted for receiving the expander pin; and
    wherein a diameter of the elongated smooth cylindrical push rod section is smaller than a diameter of the opening of the sleeve allowing the elongated push rod section and the entire length of the expander pin to pass entirely through the opening of the sleeve.

2. The fastener of claim 1, wherein a surface of the outer wall is selected from at least one of smooth, a series of outer wall annular rings, waves, threads and concentric knurls.

3. The fastener of claim 1, wherein the series of inner wall annular rings comprise first diameter rings and second diameter rings, and wherein a diameter of a ring in the first diameter rings is larger than a diameter of a ring in the second diameter rings; and wherein a surface of the inner wall transitioning between the first diameter rings and the second diameter rings is smooth.

4. The fastener of claim 1, wherein the series of expander annular rings comprise first diameter rings and second diameter rings, and wherein a diameter of a ring in the first diameter rings is larger than a diameter of a ring in the second diameter rings; and wherein a surface of the initial expander rings section transitioning between the first diameter rings and the second diameter rings is smooth.

5. The fastener of claim 1, wherein a diameter of the final expander pin head section is larger than diameters of rings in the series of expander annular rings of the initial expander rings section.

6. The fastener of claim 1, wherein a portion of the final expander pin head is located outside the sleeve head.

* * * * *